3,121,751
PRODUCTION OF PURIFIED ORTHOFORMIC ESTERS
George Kesslin, Teaneck, N.J., and Alvin Charles Flisik and Robert Wesley Handy, Stony Point, N.Y., assignors to Kay-Fries Chemicals, Inc., West Haverstraw, N.Y., a corporation of New York
No Drawing. Filed Oct. 6, 1959, Ser. No. 844,649
6 Claims. (Cl. 260—615)

This invention relates to the production of purified orthoformic esters and more particularly to the production of orthoformic acid esters having substantially lesser quantities of nitrogenous impurities.

Methods are known for producing orthoformic esters from an alcohol and hydrogen cyanide. One method is disclosed in the Copenhaver Patent No. 2,527,494 constituting an improvement in the so-called Pinner process. In the Copenhaver process, the formiminoester hydrohalides, formed in a first step, are reacted with an alcohol at a temperature of 45° C. and at a pH of 6 in the presence of an inert liquid which is a non-solvent for the ammonium halide formed as a by-product of the reaction.

However, in the commercial production of orthoformic esters from methanol and hydrogen cyanide by known processes, it has been found that the orthoformic esters contain heretofore unknown contaminants which importantly interfere with the reactions of the orthoformic esters with vinyl ethers, in the presence of boron trifluoride catalyst, to produce tetraethers of propane. After extensive experimentation, it was found that the poor yield of these tetraethers of propane was due to the presence of nitrogenous impurities, more particularly, symmetrical triazine (s-triazine). The presence of the s-triazine was definitely confirmed by spectroscopic analysis, by its melting and boiling point and by nitrogen analysis. The s-triazine, however, is the major nitrogenous contaminant and may represent 95% thereof.

It was found also that other nitrogenous impurities of an undetermined nature are present in the orthoformic esters heretofore produced from other monoalcohols and hydrogen cyanide. These other nitrogenous impurities adversely affect the odor of the orthoformic esters and may have other disadvantageous effects yet undetermined.

It is a primary object of the present invention, therefore, to produce purified orthoformic esters having substantially lesser quantities of nitrogenous impurities. It is another object of the invention to effect important chemical and operating economies in the production of orthoformic esters and yet produce these esters in a more highly purified state. More particularly, it is a special object of the invention to produce orthoformic esters, especially methyl orthoformate, substantially free of nitrogenous impurities and s-triazine in particular. Other features and objects of the invention will become apparent from the greater detailed description which follows.

In accordance with an important embodiment of this invention, purified orthoformic acid esters, having substantially lesser amounts of nitrogenous impurities, are produced by reacting a formiminoester hydrohalide with a monohydric alcohol under definitely acidic conditions at which the pH does not exceed 3. The reaction is carried out in the presence of an inert liquid diluent which is a non-solvent for the ammonium halide. Hydrocarbon solvents which are non-solvents for ammonium halides are preferred. Halogenated hydrocarbon solvents may be used also. Where methyl orthoformate is being produced, the alcoholysis preferably takes place at 15-20° C. in the presence of a hydrohalide which is the same as the hydrohalide present in the formiminoester. The alcohol should be present during the alcoholysis step in a molar excess of 20% or more. Where higher molecular weight trialkyl orthoformates are being produced, higher reactions temperatures between 25-40° C. may prove to be advantageous. In this way, the orthoformic acid esters can be produced which are substantially free of nitrogenous impurities and in a very satisfactory yield. These orthoformic acid esters, advantageously methyl orthoformic ester, may be used efficiently as intermediates in the production of tetraalkoxy propanes and other chemicals.

The significance of this embodiment of the invention will be apparent from a comparison of the purity of the methyl orthoformic ester produced in accordance with this invention and in accordance with Example 1 of Copenhaver. A methyl orthoformic ester was produced by following the exact procedure as set out in Example 1 of Copenhaver. The distillate obtained contained 3.2% of s-triazine. Even by modifying Example 1, within the scope of the general teachings of Copenhaver, it was not possible to obtain a methyl orthoformate containing less than 0.2 to 1.0% of s-triazine.

When the formiminoester hydrochloride reaction mass produced in the first step of the Copenhaver process was not treated to adjust the pH to 6 and when the pH of the second step was maintained at 3, a methyl orthoformic ester was obtained which was substantially free of s-triazine. It was possible to keep the s-triazine concentration in the orthoformic ester distillate consistently below 0.05%, or even below 0.02%, by carrying out the alcoholysis at a pH of 3. This methyl orthoformic ester reacted, without further purification, with methyl vinyl ether in the presence of small catalytic quantities of boron trifluoride to produce tetramethoxy propane in very high yields. On the other hand, it was found that the presence of 0.1% of the s-triazine in the methyl orthoformate materially inhibited the formation of the tetramethoxy propane while the presence of as much as 0.4% of the s-triazine was sufficient to make the production of the tetramethoxy propane from the orthoformic ester impractical.

It has been found that if methanol is reacted with molar quantities of hydrogen cyanide in the presence of molar quantities of a hydrogen halide to produce the methyl formiminoester hydrohalides, sufficient hydrogen halide remains unreacted to maintain a pH of not more than 3 in the subsequent alcoholysis step provided the initial reaction mass is not neutralized and provided the alcoholysis is not carried out at temperatures substantially above 25° C. On the other hand, when the alcoholysis is carried out at temperatures substantially above 25° C., such as at temperatures of 30° C. and above, it is necessary to introduce dry HCl, or other acid, into the reaction mass during the alcoholysis step to maintain a pH of not more than 3 even if the formiminoester hydrohalide reaction mass is not treated to adjust its pH to 6. Thus, in accordance with a preferred practice of this embodiment of the invention, the methyl formiminoester hydrohalide reaction mass formed in the first conversion step is not neutralized and the methanolysis step is performed at a temperature at which any unreacted hydrogen halide is not vaporized off. At a pH of 3, and below, a temperature of 15 to 18 or 20° C. is adequate to induce the reaction to take place with satisfactory speed and yet give excellent yields. Where the alcoholysis takes place with just enough acid to maintain the desired acidity, it has been found the acidity will gradually disappear when the reaction mass is left standing and a neutralization step, involving the introduction of possible contaminants, can thereby be avoided.

Where, in accordance with the teachings of the preceding paragraph, other alcohols such as ethanol, propanol, or the like, i.e. other lower alkanols, are used to produce higher molecular tetraalkyl orthoformates is has surprisingly been found that higher temperatures, say 25-40° C., may be used to induce the alcoholysis reaction to take place at satisfactory speeds and yet maintain the reaction mass at the desired acidity.

The following example will serve to further illustrate this embodiment of the invention.

*Example*

Seven hundred and seventy-five grams (775 g.) of diethyl benzene and 96 g. of absolute methanol were jointly added to a reactor equipped with a stirrer and the mixture cooled to −10° C. To this cooled mixture, 81 g. of hydrogen cyanide was slowly added. Then 109.5 g. of hydrogen chloride was bubbled into the reaction mixture over a period of 2-3 hours while maintaining the temperature of the reaction mixture between −10 and 0° C. After the addition of the hydrogen chloride, the reaction mixture was agitated for approximately 20 hours while maintaining the temperature between −10 and 0° C. In this way, methyl formiminoester hydrochloride is provided. After the formation of the formiminoester, 230 g. of absolute methanol was added while maintaining the temperature of the reaction mass below 0° C. After this second addition of methanol, the reaction mixture was heated to 15° C. and maintained at a temperature between 15-18° C. for six hours. The pH of the reaction mass did not exceed 3 and it was continuously acidic to Congo Red. Care was exercised to control the reaction temperature so that the reaction mass remained acidic to Congo Red throughout the methanolysis. During the alcoholysis with the methanol, the ammonium chloride by-product precipitated out as a salt cake. The alcoholysis reaction mixture was filtered at 15° C. to separate out the salt cake and the salt cake was washed twice with 100 ml. of diethyl benzene. The resulting filtrate was still acidic to Congo Red. After standing for 6 hours at room temperature, the acidity of the filtrate disappeared. During the period of standing, a small amount of crystalline material developed so the filtrate was refiltered and this filtrate subjected to distillation in a known manner through a packed distillation column at a temperature not exceeding 135° C.

In this way, a trimethyl orthoformate free of triazine was obtained in yield equalling 77% of the hydrogen cyanide consumed. Any important quantities of unreacted hydrogen cyanide and methanol and substantially all of the diethyl benzene were suitable for reuse in the production of further quantities of the methyl orthoformic ester.

In accordance with another embodiment of this invention, the orthoformic esters are purified by reacting nitrogenous impurities with a heavy metal salt to form a complex coordination compound. The reaction may be easily effected at room temperature by agitation of the impure product with the heavy metal salt. The coordination compounds are separated from the reaction mixture by filtration, advantageously after stirring the heated mass with an adsorbent, and the purified orthoformic esters are recovered by fractional distillation in accordance with past practices. Various heavy metal salts may be used including $CuCl_2 \cdot 2H_2O$, $CoCl_2 \cdot 6H_2O$ and $ZnCl_2$. In this way, the nitrogenous impurities can be eliminated and the methyl orthoformic ester can be produced having an s-triazine content less than 0.01%. Other heavy metal salts work to somewhat less advantage such as $NiCl_2 \cdot 6H_2O$, $AlCl_3$ and $FeCl_3$. It will be seen that the orthoformic esters purified with the heavy metal salts are sufficiently free of nitrogenous impurities for use as intermediates.

In accordance with another embodiment of the invention, the nitrogenous impurities are removed from the impure orthoformic esters by the use of an ion exchange resin. The nitrogenous impurities may be removed by flowing the impure orthoformic ester over a bed of the ion exchange resin. A suitable ion exchange resin may be obtained from the Dow Chemical Company under the trade designation of Dowex 50W-X12. This resin is a cation exchange resin composed substantially of a sulphonated styrene divinyl benzene copolymer.

In accordance with a further embodiment of the invention, it has been found that certain impure orthoformic esters of the prior art can be importantly purified by the careful introduction of small quantities of hydrohalides, preferably hydrogen chloride, to produce a neutral reaction mass and then separating the formed precipitate before the conventional distillation. The acid should be added gradually and its addition discontinued as soon as the precipitates are no longer formed. The separation of the solid impurities by filtration is facilitated by the introduction of an adsorbent such as Nuchar. For example, when a trimethyl orthoformate containing 0.048% of triazene, such as produced in conformity with prior art practices, is treated with 0.4% HCl and with sufficient Nuchar to absorb the impurities for ½ hour at room temperatures, filtered and the filtrate subjected to distillation, a purified trimethyl orthoformate is produced containing only 0.004% triazine.

In accordance with yet another embodiment of the invention, where higher orthoformic esters are produced, such as ethyl orthoformic ester and higher alkyl esters, the nitrogenous impurities are separated from the impure esters by fractional distillation. After identifying the impurities, their separation was possible due to the differences in their boiling point and the boiling point of the higher esters. Such a purification procedure could not be used on the trimethyl orthoformate which is the most important orthoformic ester from a commercial viewpoint.

Certain advantages are obtained by converting the formiminoester hydrohalides into the orthoformic esters at an acidity of at least pH 3 and some of these advantages have been set out above. For example, a neutralization of the formiminoester hydrohalide reaction product has been found to be unnecessary and a product of commercially acceptable purity can be obtained without the additional purification steps set out herein. On the other hand, the other separate purification steps mentioned above, especially treatment with a hydrohalide or a heavy metal salt, are more effective in removing the unidentified noxious nitrogenous substances representing a minor fraction of the nitrogenous impurities. Thus the purification procedures set out herein representing a separate treatment of the impure orthoformic esters prior to their recovery by distillation may be used independently, or conjointly if desired, with a control of the pH in the alcoholysis step to a pH of not more than 3.

Numerous details have been given to illustrate the practice of the invention. It will be apparent, however, that the principles of the invention are applicable to the production of orthoformic esters from alcohols and hydrogen cyanide and that these details can be varied widely by effecting substitutions, additions and omissions without departing from the scope of the invention which is defined in the appended claims.

What is claimed is:

1. Method for the preparation of lower alkyl orthoformic esters of high purity and in which nitrogenous impurities, expressed as s-triazine, do not exceed about 0.05% by weight, which comprises reacting a lower alkyl formimino ester hydrohalide with a molar excess of a lower alkanol at a pH not greater than 3 to form said orthoformic ester and ammonium hydrohalide, in the presence of an inert liquid diluent which is a nonsolvent for said ammonium hydrohalide, said diluent being selected from the group consisting of hydrocarbons and halogenated hydrocarbons, at a temperature between about 15° and about 40° C.

2. The method of claim 1 in which the lower alkanol is methanol and the temperature is between about 15° and about 20° C.

3. The method of claim 1 in which the lower alkanol is higher than methanol and the temperature is between about 25° and about 40° C.

4. The method of claim 1 in which the lower alkanol is present in a molar excess of at least 20%.

5. Method for the preparation of lower alkyl orthoformic esters of high purity and in which nitrogenous impurities, expressed as s-triazine, do not exceed about 0.05% by weight, from a lower alkanol and hydrogen cyanide, which comprises the steps of reacting said lower alkanol and hydrogen cyanide in approximately molar ratio to form a lower alkyl formimino ester hydrohalide in the presence of a concentration of a hydrohalide sufficient to maintain the pH of the reaction mixture not greater than 3, and then reacting said lower alkyl formimino ester hydrohalide with a molar excess of a lower alkanol at a pH not greater than 3 to form said orthoformic ester and ammonium hydrohalide, in the presence of an inert liquid diluent which is a nonsolvent for said ammonium hydrohalide, said diluent being selected from the group consisting of hydrocarbons and halogenated hydrocarbons, at a temperature between about 15° and about 40° C.

6. The method of claim 5 in which the lower alkanol is methanol, and the temperature of the reaction between the lower alkyl formimino ester hydrohalide and lower alkanol is between about 15° and about 20° C.

References Cited in the file of this patent

UNITED STATES PATENTS 2,527,494     Copenhaver  ------------ Oct. 24, 1950